(12) United States Patent
Brewster

(10) Patent No.: US 6,809,841 B2
(45) Date of Patent: Oct. 26, 2004

(54) MARKING PRINT DOCUMENTS FOR VISIBLE OWNERSHIP

(75) Inventor: Jon A. Brewster, Monmouth, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 505 days.

(21) Appl. No.: 09/917,015

(22) Filed: Jul. 26, 2001

(65) Prior Publication Data

US 2003/0020957 A1 Jan. 30, 2003

(51) Int. Cl.[7] .............. G06F 3/12; G06F 15/00; G06K 15/02
(52) U.S. Cl. ............ 358/3.31; 358/1.9; 358/1.18; 270/52.01; 270/52.02; 270/52.03
(58) Field of Search ............... 358/1.12, 1.9, 358/3.31, 440, 1.18; 380/54, 55, 202, 203; 283/69, 70, 74, 75, 113; 382/131, 182, 183, 284; 270/52.01, 52.02, 520.03

(56) References Cited

U.S. PATENT DOCUMENTS

| | | | | |
|---|---|---|---|---|
| 4,939,674 A | * | 7/1990 | Price et al. ............... | 358/1.9 |
| 5,316,279 A | * | 5/1994 | Corona et al. ............. | 270/1.01 |
| 5,533,176 A | * | 7/1996 | Best et al. ................ | 358/1.18 |
| 5,644,685 A | * | 7/1997 | Baehr ...................... | 358/1.12 |
| 5,709,374 A | * | 1/1998 | Taylor et al. .............. | 270/1.02 |
| 5,737,454 A | * | 4/1998 | Park et al. ................ | 382/284 |
| 6,157,436 A | * | 12/2000 | Cok ........................ | 355/40 |
| 6,227,531 B1 | * | 5/2001 | Guerrero et al. .......... | 270/58.31 |
| 6,321,208 B1 | * | 11/2001 | Barnett et al. ............ | 705/14 |
| 6,330,976 B1 | * | 12/2001 | Dymetman et al. ........ | 235/487 |
| 6,404,513 B1 | * | 6/2002 | Denker .................... | 358/407 |
| 6,466,329 B1 | * | 10/2002 | Mukai ..................... | 358/1.15 |
| 6,493,110 B1 | * | 12/2002 | Roberts ................... | 358/1.2 |

* cited by examiner

Primary Examiner—Twyler Lamb
Assistant Examiner—Alan Rahimi

(57) ABSTRACT

The present invention provides a method and system for marking pages printed for a print job in correspondence with an identification of a user that initiates a print job. The method may include indicating, to a printer, the identification of the user, selecting, by the user, a mark to associate with the user's identification, sending, by the user, the print job to the printer, and printing, by the printer, the mark automatically on each page printed for the print job.

20 Claims, 6 Drawing Sheets

MARKING PRINT DOCUMENTS FOR VISIBLE OWNERSHIP

FIELD OF THE INVENTION

The invention relates generally to image forming devices and, more particularly, to identification of deliveries of individual content to a shared printer.

BACKGROUND OF THE INVENTION

When more than one user shares a printer, it may be difficult as well as time-consuming to determine whose document has been printed out. Cover sheets as well as banner pages have been used to identify the source computer in shared printer environments. For example, a banner sheet may be output at the beginning or at the end of a print job. Where multiple copies of a print job are processed, typically a banner sheet is printed for each copy printed. When utilizing a banner sheet to indicate the source of the print job, generally the user may only choose either to print a banner sheet with the print job, which is typically the default setting, or refrain from printing a banner sheet with the print job. However, where the banner sheet option is controlled by the shared print server, the user may not have the option of choosing whether or not to print the banner sheet.

Some printers have been developed to avoid such a problem by allowing the selection of printing multiple copies of a print job and indicating the combined multiple copy printing as a single print job. Thus, such a process may involve multiple pages. However, sometimes the cover sheet or banner page may become separated from the printed material, making source identification more difficult.

In addition, personalization headlines or other identifiers have been used to identify the source computer for the content material. However, the use of personalization headlines or other identifiers is not always desirable for all print jobs.

Thus, there is a need for a method and system for marking print jobs in an efficient, cost-effective manner that may be utilized to determine print job ownership for any respective print job. The present invention is directed to overcoming or at least reducing the effects of one or more of the problems set forth above.

SUMMARY OF THE INVENTION

The present invention provides a method and system for marking pages printed for a print job in correspondence with an identification of a user that initiates a print job. The identification of the user is indicated to a printer and a selection is made by the user, of a mark to associate with the user's identification. The user sends the print job to the printer and the printer prints the mark automatically on each page printed for the print job.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
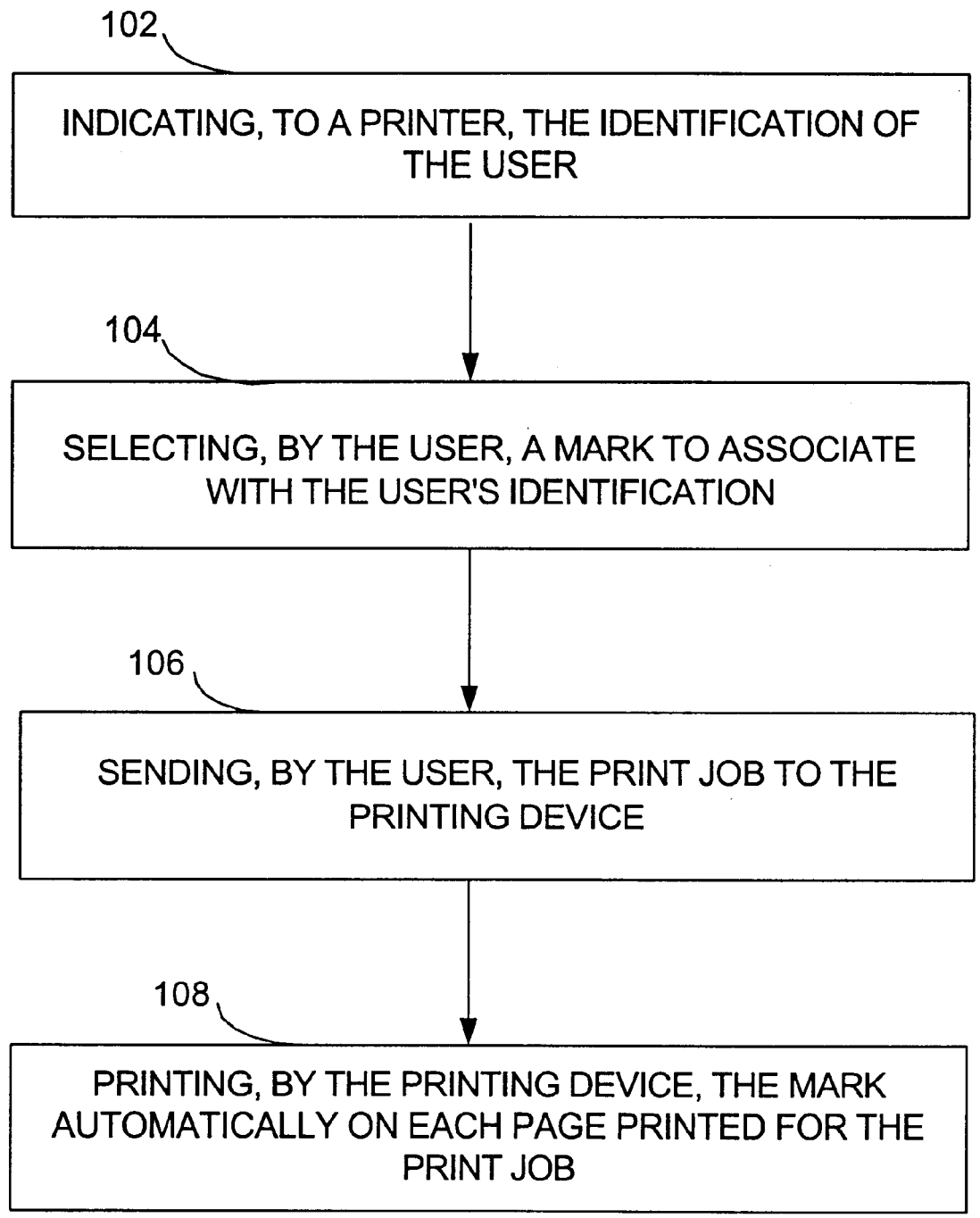
FIG. 1 is a flow chart showing one embodiment of the method of the present invention wherein pages are marked to identify a user when a print job is printed.

The present invention provides for marking each page of a print job to indicate "ownership", i.e., identification of the user initiating the print process, of the print job. In this manner, a plurality of print jobs for a plurality of users may be readily identified at the printer output, saving the different users from having to read print jobs printed by other users in order to determine "ownership".

When a printer is attached to a node or host, the printer is typically called a local printer. Nodes or hosts that are not directly linked to the printer may be connected to a network, generally using Transmission Control Protocol/Internet Protocol (TCP/IP) to provide a remote print system that allows printer access.

A print job is a unit of work to be printed on a printer. A print job may include printing one or more files, depending on the particular print request. A print job is directed to a named queue that points to the associated queue device. The queue device specifies the printing device that is to be printed to and the printer backend that should be used. A printer backend is a group of programs called by a command for the spooler to manage a print job that is queued for printing. The printer backend receives a list of one or more files to be printed from the command. Then, the printer backend uses the printer and formatting attribute values from a database, initializes the printer before printing a file, may run filters if needed to convert the print data stream to a format supported by the printer, and typically provides filters for simple formatting of ASCII documents. In addition, the printer backend typically provides support for printing national language characters, passes the filtered print data stream to the printing device driver, may generate header and trailer pages, generates multiple copies if selected, reports paper out, intervention required, and printer error conditions, reports problems detected by the filters, eliminates the data stream when a print job is cancelled, and generally provides a customizable print environment for system administrators. Also, a spooler may be utilized, for example, for queuing a plurality of print jobs that are queued for a printer. A spooler may also queue jobs for the printer backend programs so that the system administrator may send commands to invoke desired printer backend programs.

Typically, a software program provides a plurality of preselected print job definitions that define fields for at least some of the following: the number of copies to be printed, the file contents such as byte stream or text, tab size, suppression of form feed for a predetermined number of lines that represent the number of lines to be printed for a page, notification of a user by sending a message when the print job is finished, a parameter that indicates the type of job, a print banner instruction, print banner information, a user name banner, the print port to be used, a timeout enablement function, a timeout length, a destination file server for the print job, a queue to be used for the print job, a print server, the name of the printer, and a mode to be used with the print job. Generally, many of the print job definitions may be preselected so that only a few print job definitions are reset for each print job.

The present invention provides a method and system for configuring a printer job configuration to include a selectable definition that allows a user to select a predefined icon, an identification mark, a color identifier, or make a drawing electronically that may be used to identify the user as the person initiating the print job. The system is arranged so that selection of an icon, mark, or color identifier by one user eliminates that icon, mark, color identifier from the selectable choices remaining as choices for other users to select. When the icon, mark, color identifier or drawing is selected and any other selectable print job definitions have been selected, the print job is activated. As each page prints out, the icon, mark, color identifier or drawing selected is printed on the page in addition to the file that the user has selected to print. The user may select the location on the document where he wishes the icon, mark, color identifier or drawing to be printed. Typically, the user chooses to have the icon, mark, color identifier or drawing printed in a selected corner of the document. However, the icon, mark, color identifier or drawing may be printed in a margin anywhere, or, if a color is selected, the color may be selected to overlap the printing, if desired. Thus, the user may readily ascertain which printouts he activated without reading each document page. For example, where individuals share a printer and send documents to the printer to be printed close in time, the individuals have no difficulty.

As shown in FIG. 1, the method of the present invention provides for marking pages printed for a print job in correspondence with an identification of a user to indicate ownership. The steps include: indicating (102), to a printer, the identification of the user; selecting (104), by the user, a mark to associate with the user's identification; sending (106), by the user, the print job to the printer; and printing (108), by the printer, the mark automatically on each page printed for the print job. The mark is typically an icon, an identification mark, or a color identifier. An identification mark may be a mark drawn electronically by the user. Generally, a mark is printed on a preselected corner of each page. However, a color mark may overlap printing of the print job.

Figure 2:
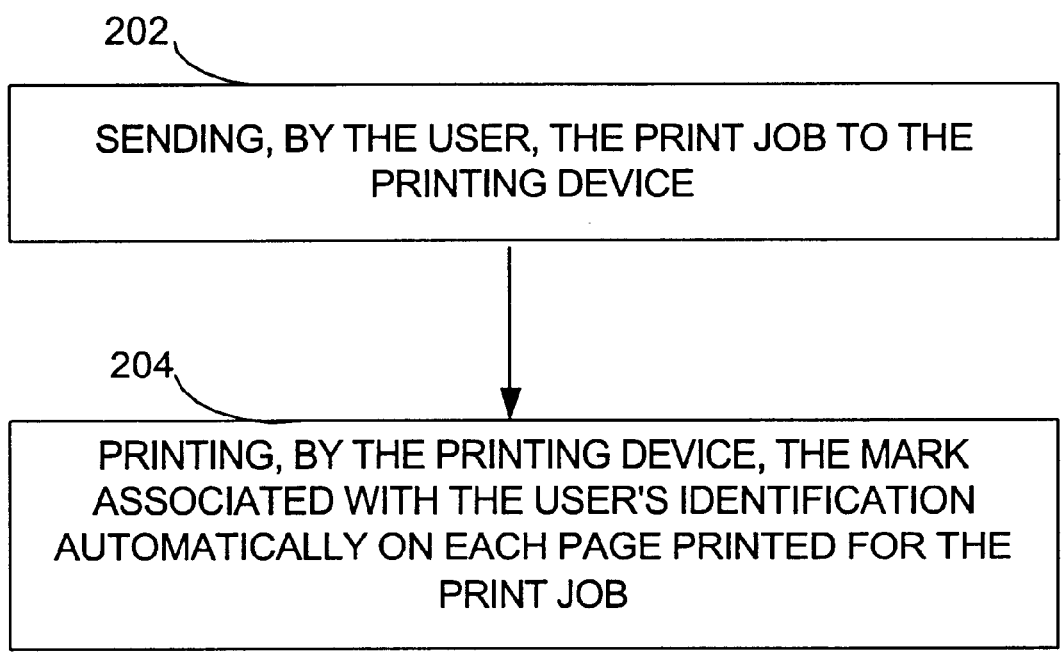
FIG. 2 is a flow chart showing steps for another embodiment of a method for marking pages printed for a print job to identify a user in accordance with the present invention.

FIG. 2 shows another embodiment of a method for marking pages printed for a print job to identify a user in accordance with the present invention. Where the user has previously indicated to a printer the user's identification and has selected a mark to be associated with the user's identification, the method includes the steps of sending (202), by the user, the print job to the printer; and printing (204), by the printer, the mark associated with the user's identification automatically on each page printed for the print job. The mark is typically as described above.

Figure 3:
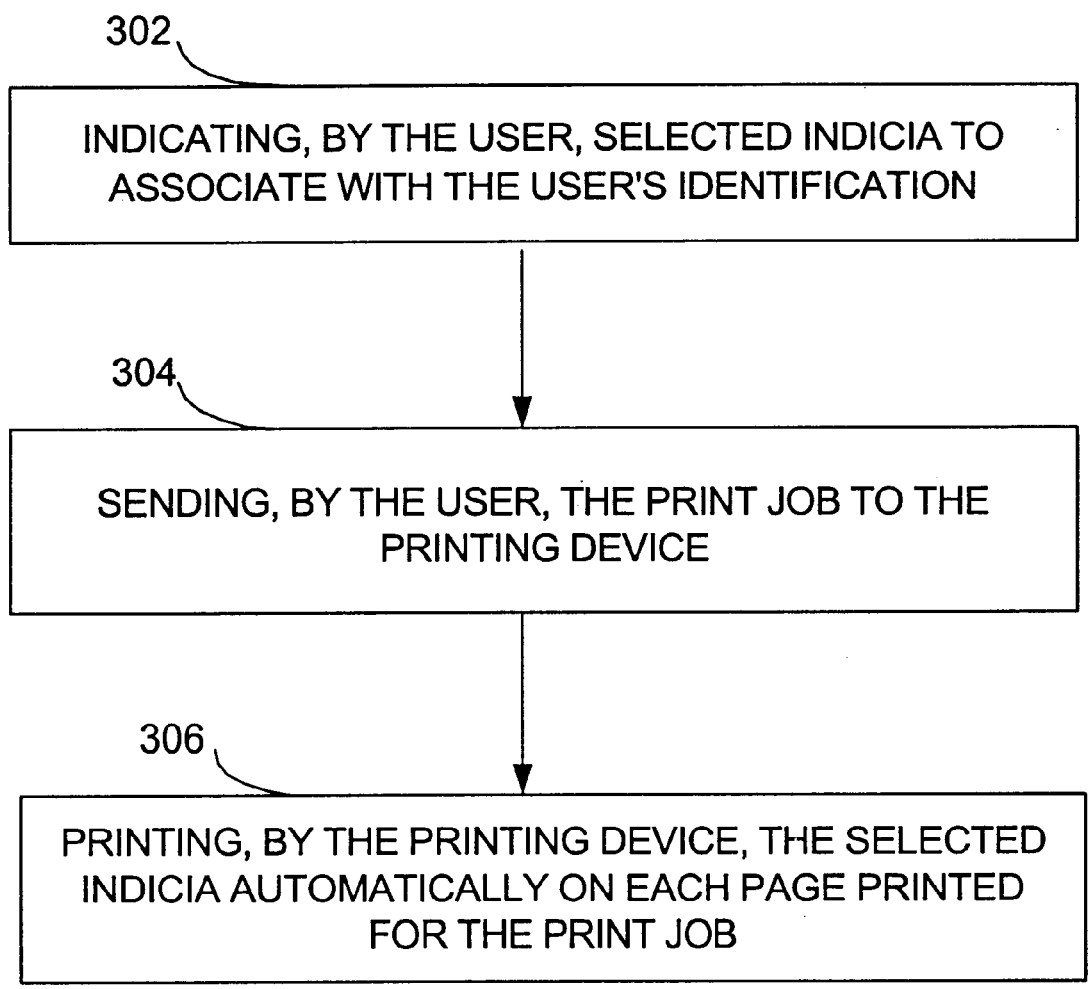
FIG. 3 is a flowchart showing another embodiment of steps for a method in accordance with the present invention for providing for inserting user indicia on pages of a print job to indicate a user initiating the print job.

FIG. 3 is a flowchart showing one embodiment of steps for a method in accordance with the present invention for providing for inserting user indicia on pages of a print job to indicate a user initiating the print job. The steps include: indicating (302), by the user, selected indicia to associate with the user's identification; sending (304), by the user, the print job to the printer; and printing (306), by the printer, the selected indicia automatically on each page printed for the print job. Selected indicia may be, for example, any of the marks described above, including indicia drawn by the user, and are typically printed on a corner of each page of pages printed for the print job.

Figure 4:
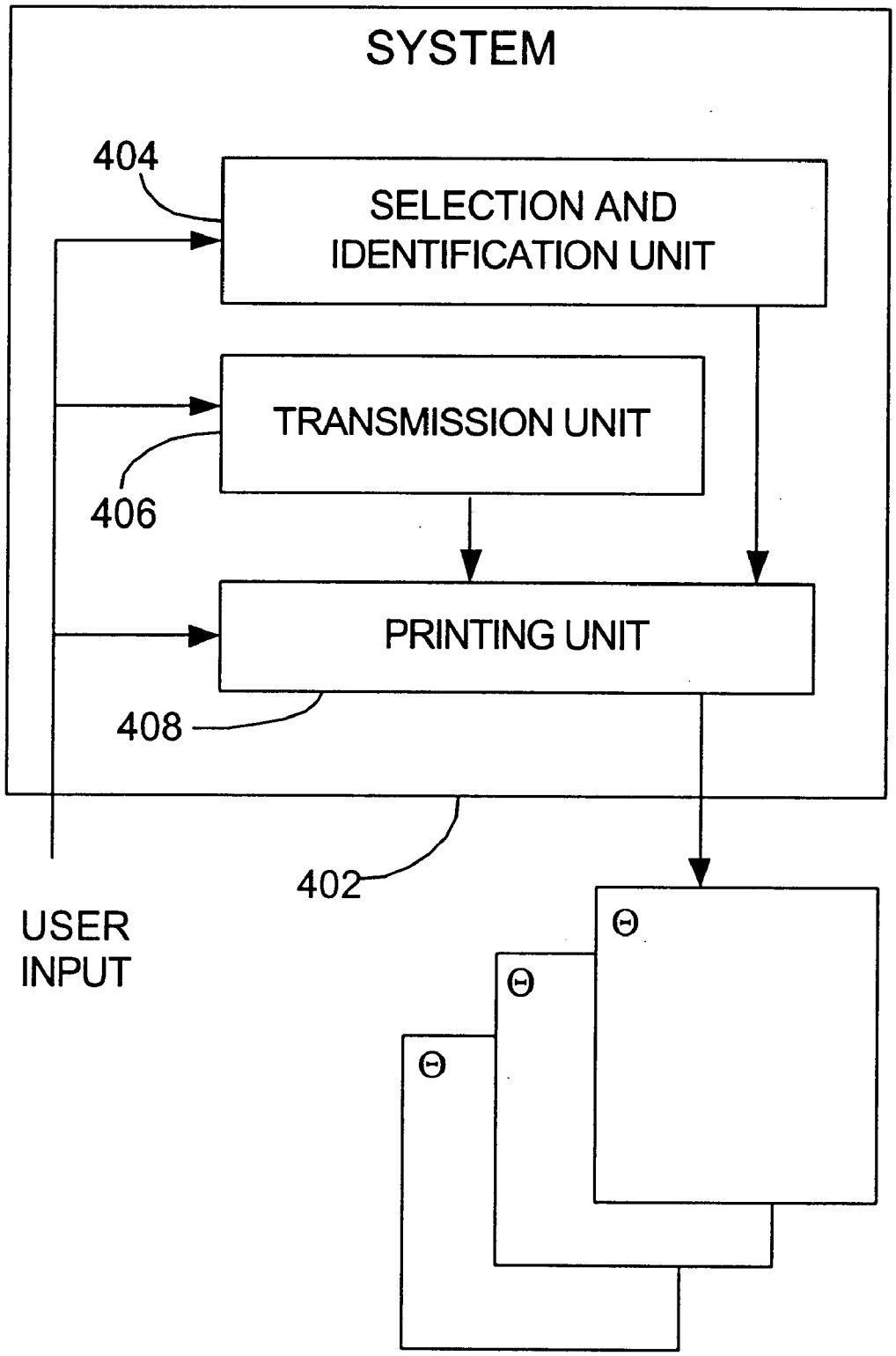
FIG. 4 is a block diagram showing one embodiment of a system for providing marked pages in accordance with the present invention, wherein pages printed for a print job show identification of a user that initiated the print job.

FIG. 4 is a block diagram showing one embodiment of a system for providing marked pages in accordance with the present invention, wherein pages printed for a print job show identification of a user that initiated a print job. The system (402) includes a selection and identification unit (404), a transmission unit (406), and a printing device (408). The selection and identification unit (404) is coupled to the printing device (408) and receives user input for selecting a mark to associate with a user's identification. The selection and identification unit (404) indicates the mark that identifies the user to the printing device (408). The transmission unit (406) is coupled to the printing device (408) and is used for sending the print job to the printing device (408). The printing device (408) is coupled to the selection and identification unit (404) and to the transmission unit (406). The printing device (408) prints the mark on each sheet of the print job automatically. Marks such as those described above may be utilized and are usually printed on a preselected corner of each page.

Figure 5:
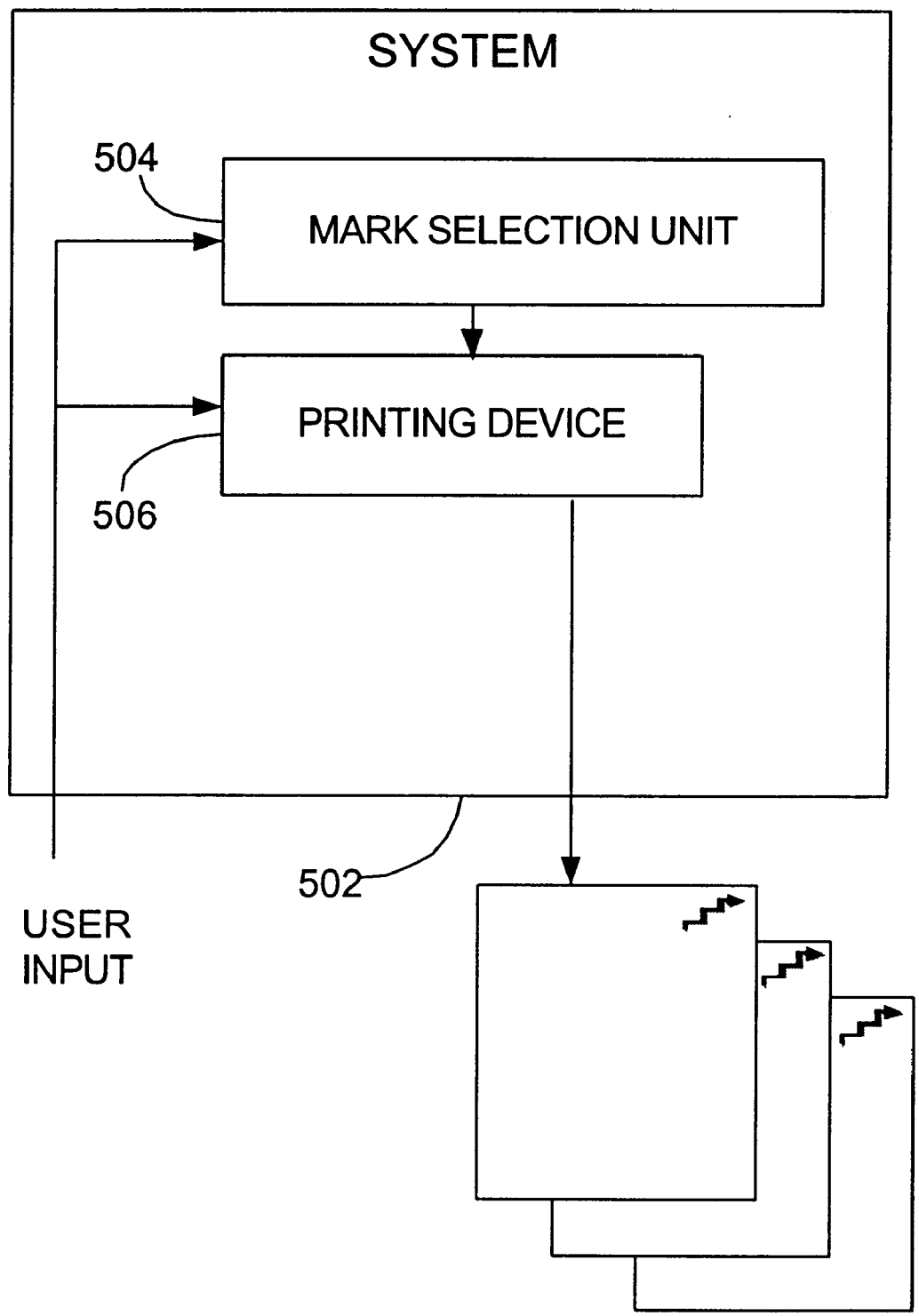
FIG. 5 is a block diagram of one embodiment of a system for marking, in accordance with the present invention, pages printed for a print job in correspondence with an identification of a user that initiates the print job.

FIG. 5 is a block diagram of one embodiment of a system for marking, in accordance with the present invention, pages printed for a print job in correspondence with an identification of a user that initiates a print job. The system (502) typically includes a mark selection unit (504) and a printing device (506). The mark selection unit (504) is coupled to receive user input and to the printing device (506). The use selects a user identification mark or draws a mark for identification and sends the mark to the printing device. The printing device (506) prints the mark selected automatically on each page of the print job. Again the mark may be any mark described above.

Figure 6:
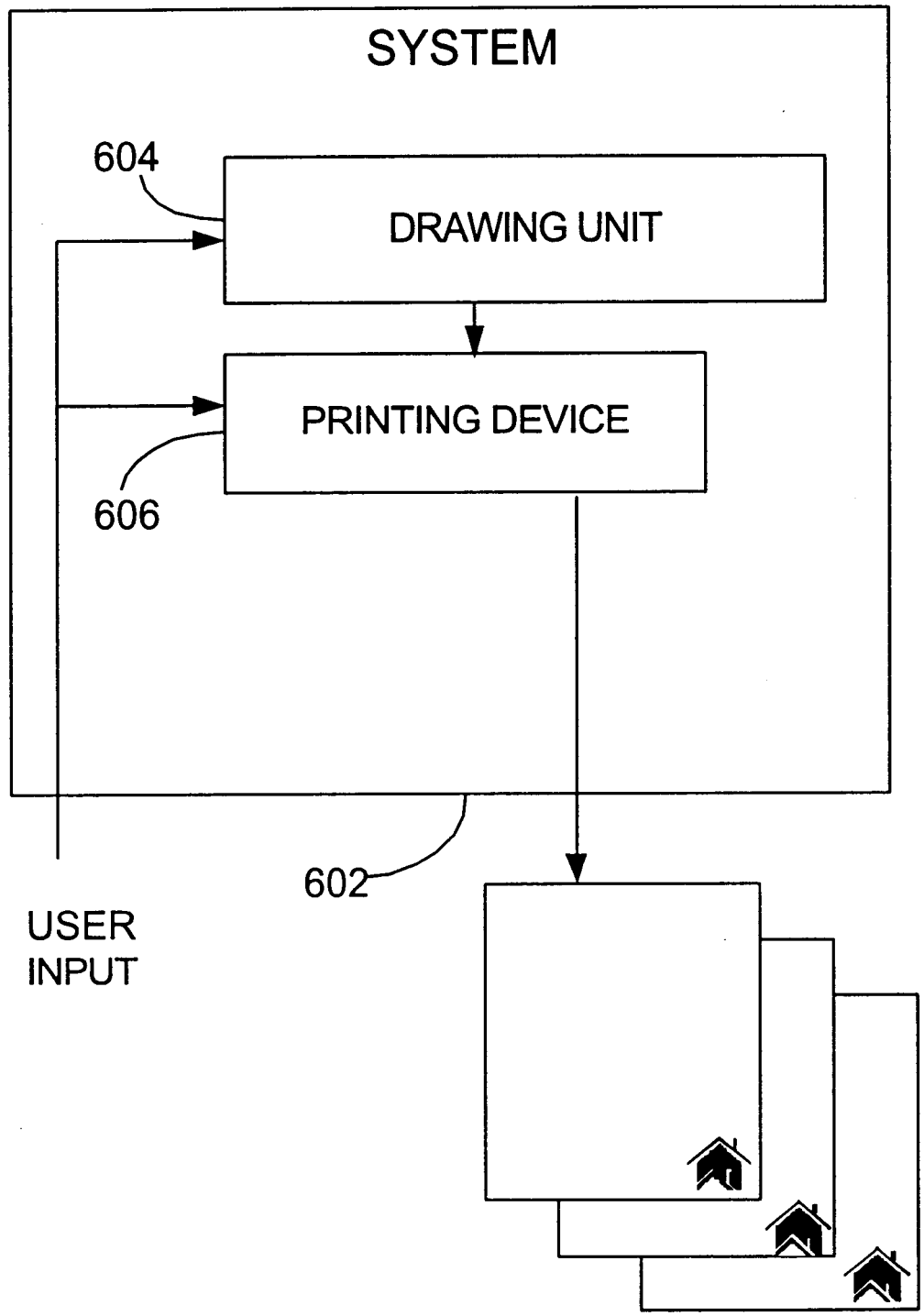
FIG. 6 is a block diagram of another embodiment of a system for providing for inserting user indicia on pages of a print job to indicate a user initiating the print job in accordance with the present invention.

FIG. 6 is a block diagram of another embodiment of a system (602) for providing for inserting user indicia on pages of a print job to indicate a user initiating the print job in accordance with the present invention. A drawing unit (604) is coupled to receive user input and to a printing device. The user prepares a drawing on the drawing unit (604) to identify his ownership for print jobs and sends the drawing mark to the printing device (606). The printing device (606) is coupled to receive user input for initiating a print job and to the drawing unit to receive the drawing prepared by the user. The printing device (606) prints the drawing mark automatically on each page of the print job.

Thus, a method and system has been described for providing marking of print documents for visible ownership according to the present invention.

What is claimed is:

1. A method for marking pages printed in a shared printing environment, comprising:
   indicating, to a printer that is shared by plural users, a first identification of a first user of a first print job;
   selecting, by the first user, a mark to associate with the first user's identification;
   sending, by the first user, the first print job to the printer;
   using the first identification to associate ownership of the first print job with the first user and to disassociate ownership of the first print job with other users of the shared printer; and
   printing, by the printer, the first mark automatically on each page printed for the first print job.

2. The method of claim 1 wherein the mark is one of: an icon, an identification mark, and a color identifier.

3. The method of claim 2 wherein the mark is printed on a corner of each page of pages printed for the print job.

4. A method for marking pages printed in a shared printing environment, comprising:
   where a first user has previously indicated to a printer that is shared by plural users a first identification and has selected a first mark to be associated with the first user's identification,
   sending, by the first user, a first print job to the printer;
   printing, by the printer, the first mark associated with the user's identification automatically on each page printed for the first print job; and
   using the first identification to associate ownership of the first print job with the first user and to disassociate ownership of the first print job with other users of the shared printer.

5. The method of claim 4 wherein the mark is one of: an icon, an identification mark, and a color identifier.

6. The method of claim 5 wherein the mark is printed on a corner of each page of pages printed for the print job.

7. A method for printing documents in a shared printing environment, comprising:
   indicating, by a first user, user indicia to associate with a first identification of the first user;
   sending, by the first user, a first print job to a printer that is shared by plural users;
   printing, by the printer, the user indicia of the first user automatically on each page printed for the first print job; and
   using the first identification to associate ownership of the first print job with the first user and to disassociate ownership of the first print job with other users of the shared printer.

8. The method of claim 7 wherein user indicia is one of: an icon, an identification mark, a color identifier, and a drawing.

9. The method of claim 7 wherein the user indicia is printed on a corner of each page of pages printed for the print job.

10. The method of claim 7 wherein the user indicia is a drawing drawn by the user and selected for user identification.

11. A system for printing documents with a shared printing device being used by plural users in a shared printing environment, comprising:
    a selection and identification unit, coupled to the shared printing device and to receive user input from the plural users, for selecting a first mark for a first user to associate with a first identification of the first user and indicating the first mark and the first user's identification to the shared printing device;
    a transmission unit, coupled to the shared printing device, for sending, by the first user, a first print job to the shared printing device; and
    using the first identification to associate ownership of the first print job with the first user and to disassociate ownership of the first print job with other users of the shared printer; and
    the printing device, coupled to the selection and identification unit and the transmission unit, for printing the first mark and the first print job automatically.

12. The system of claim 11 wherein the mark is one of: an icon, an identification mark, and a color identifier.

13. The system of claim 11 wherein the mark is printed on a preselected corner of each page of pages printed for the print job.

14. A system for marking pages of plural users printed with a shared printing device in a shared printing environment, comprising:
    a mark selection unit, coupled to receive user input from the plural users and to the shared printing device, for selection of a first mark by the first user and identifying the first user to the shared printing device; and
    using the first identification to associate ownership of a first print job with the first user and to disassociate ownership of the first print job with other users of the shared printer; and
    the shared printing device, coupled to receive user input and to the mark selection unit, for printing the first mark selected automatically on each page printed for the first print job.

15. The system of claim 14 wherein the mark is one of: an icon, an identification mark, and a color identifier.

16. The system of claim 14 wherein the mark is printed on a corner of each page of pages printed for the print job.

17. A system for printing pages with a shared printing device by plural users in a shared printing environment, comprising:
    a drawing unit, coupled to receive user input from the plural users and to the shared printing device, for inserting a first drawing mark made by a first user for identification and sending the first drawing mark to the shared printing device;
    using the first identification to associate ownership of a first print job with the first user and to disassociate ownership of the first print job with other users of the shared printer; and
    the shared printing device, coupled to receive user input from the plural users and to the drawing unit, for printing the first drawing mark automatically on each page printed for the first print job associated with the first user.

18. The system of claim 17 wherein the drawing mark is one of: an icon, an identification mark, a color identifier, and a drawing.

19. The system of claim 17 wherein the drawing mark is printed on a corner of each page of pages printed for the print job.

20. The system of claim 17 wherein the drawing mark is drawn by the user and identifies the user for the print job.

* * * * *